United States Patent [19]
Kiese

[11] Patent Number: 4,767,123
[45] Date of Patent: Aug. 30, 1988

[54] DUAL RING PISTON-RING SYSTEM WITH SPRING RING BIAS MEANS

[75] Inventor: Gerhard Kiese, Cologne, Fed. Rep. of Germany

[73] Assignee: Leybold-Heraeus GmbH, Cologne, Fed. Rep. of Germany

[21] Appl. No.: 901,018

[22] Filed: Aug. 28, 1986

[30] Foreign Application Priority Data

Sep. 2, 1985 [EP] European Pat. Off. ........ 85111059.3

[51] Int. Cl.[4] .............................. F16J 9/06; F16J 9/16
[52] U.S. Cl. .................................... 277/139; 277/141;
   277/151; 277/156; 277/163; 277/220
[58] Field of Search ............... 277/138, 139, 141, 151,
   277/154, 156, 157, 163, 216, 220–222

[56] References Cited

U.S. PATENT DOCUMENTS

| | | |
|---|---|---|
| 412,227 | 10/1889 | Allen .................................... 277/151 |
| 1,391,795 | 9/1921 | Safford ................................. 277/221 |
| 1,473,446 | 11/1923 | Scott ..................................... 277/163 |
| 2,877,071 | 3/1959 | Arnot ................................ 277/216 X |
| 2,906,101 | 9/1959 | McMahon et al. . |
| 3,455,565 | 7/1969 | Jepsen . |
| 4,355,519 | 10/1982 | Kercheval et al. . |

FOREIGN PATENT DOCUMENTS

| 1700 | of 1866 | United Kingdom ................ 277/139 |
|---|---|---|
| 10948 | of 1900 | United Kingdom ................ 277/141 |

*Primary Examiner*—Robert S. Ward
*Attorney, Agent, or Firm*—Felfe & Lynch

[57] ABSTRACT

A piston-ring system has two, equal-radius, coaxial, axially-contiguous sealing rings, each ring having a split circumferential offset from the split in the other ring, each split being substantially Z-shaped in a plane normal to the axis of the rings to have a substantially-circumferential, overlappable middle portion. Each ring is urged, at least at the middle portion of its split, radially.

20 Claims, 1 Drawing Sheet

DUAL RING PISTON-RING SYSTEM WITH SPRING RING BIAS MEANS

BACKGROUND OF THE INVENTION

The invention relates to a piston-ring system and, more particularly, a plastic ring system for sealing a piston-like, cylindric, refrigerator displacer reciprocably in a cylindric housing.

Some refrigerators produce low-temperatures by reciprocating a piston-like displacer in a gas-containing housing in a thermodynamic cycle. (See, for example, U.S. Pat. No. 2,906,101.) A single-stage refrigerator of this type generally has a cylindric housing chamber for a single, cylindric displacer that is coupled to an electric or pneumatic drive for reciprocation therein. The chamber is alternately connected, in a particular manner, with high- and low-pressure, working-gas sources. The working gas flows through a regenerator in the displacer before and after expansion by the reciprocation of the displacer for the thermodynamic cycle (Stirling cycle, Gifford/McMahon cycle, etc.) of the refrigerator. As a result, heat is abstracted from a specific region of the chamber. With a refrigerator of this type having two such stages and helium as the working gas, temperatures of 10 K or lower can be produced.

A necessary, critical aspect, which is of decisive importance for the operation of such a refrigerator, is lubricant-free sealing of the displacer relative to the chamber wall of the housing which surrounds it. On the one hand, the seal must satisfy stringent tightness requirements to assure the flow of the working gas through the regenerator and, thus, the refrigerator. On the other hand, the seal should produce as little friction as possible with the housing-chamber wall during displacer reciprocation, because such friction would be accompanied by evolution of heat which is particularly undesirable in a refrigerator.

Because of their good antifriction properties, plastics and, particularly, polytetrafluoroethylene (hereinafter PTFE) have gained wide acceptance as sealing materials. However, a drawback of PTFE is its highly-nonuniform and irreversible heat-shrinking behavior. Even rings made from one and the same block of PTFE material shrink differently. This drawback is particularly manifest in a PTFE sealing ring for refrigerator displacer because of the very-considerable temperature differences it experiences.

Nevertheless, a PTFE sealing-ring system for a reciprocating-displacer refrigerator is known from U.S. Pat. No. 4,355,519. It consists of a PTFE sealing ring held in a radial groove in the displacer by an axially-acting spring ring. The sealing ring is radially split in a section which is axially Z-shaped, in other words, Z-shaped perpendicularly to the plane of the sealing ring which is normal to the axis of the sealing ring. The resulting, overlapping portions of the split in the sealing ring are intended to compensate for circumferential length changes (e.g., shrinkage) from temperature fluctuations or wear. One disadvantage of this design is its complexity. The axially-acting spring ring, which reacts from one axial-end wall of the groove, cannot be split, and the displacer must be, therefore, of two-part construction to permit mounting the spring ring. Moreover, even slight shrinkage of the sealing ring material impairs the integrity of the seal, because the axially opposite ends of the Z-shaped split then open, and these communicate through the groove radially inward of the sealing ring.

Another split, possibly-plastic, piston-sealing ring is known from U.S. Pat. No. 3,455,565. Its split is arcuate, preferably circularly, in the plane of the ring. This ring has the drawback that its radial thickness changes in proximity to the split when the material shrinks. This has the effect that the radially outward forces of a spring inside the sealing ring for this are no longer uniform around the periphery of the ring. Two such rings, axially contiguous but with circumferentially-offset splits, are also disclosed.

SUMMARY OF THE INVENTION

An object of the invention is, therefore, to provide a sealing ring system which so accommodates the marked shrinkage of PTFE ring material, for example, as to permit its use while keeping uniform radial forces from an inner spring even after shrinkage-induced circumferential movement of the ring material.

In accordance with the invention, this and other objects are accomplished by a piston-ring system having two, equal-radius, coaxial, axially-contiguous sealing rings, each ring having a split circumferentially offset from the split in the other ring, preferably by 180 degrees, each split being substantially Z-shaped in a plane normal to the axis of the rings. Each split therefore has a substantially-circumferential, overlappable, middle portion and a device urges at least this portion radially. Such a system may be used about a piston, such as a refrigerator displacer, for example, or a housing therefor which are relatively displaceable axially, even if the rings are plastic, such as PTFE, for example.

A sealing system of this type meets the requirements imposed by displacer-operated refrigerators exceedingly well. So long as the middle, circumferential sections of the Z-shaped split in each sealing ring overlap, the ring pair forms an effective axial seal. Because of the Z-shape of the splits in the plane of the rings, the width of the rings is substantially unaffected by their shrinkage, and the radial force exerted by the device therefor remains constant. This makes it possible to use a very low radial force which results in very low friction. The very low friction produces very little heat and wear.

A further advantage is that the overlappable middle, circumferential section of the Z-shaped split in each ring can be made relatively long. It may extend over a segment angle of from about 15 to about 45 degrees, for example, and preferably about 30 degrees. This provides assurance that even marked shrinkage of the ring material will not impair the sealing action.

To produce a bearing radial, pressure that is particularly uniform all around the periphery of both sealing ring, it is advisable to use a wire-coil spring-ring device, the axis of the wire coil being in the plane of the rings so that a plurality of the turns of the wire coil bear on each of the sealing rings. A spring ring of this type is capable of providing sealing-restoring forces either when its originally-circular coil and/or ring shape is deformed into an oval, especially if the coils are or become inclined to the radial direction of the sealing rings.

BRIEF DESCRIPTION OF THE DRAWING

Further advantages and details of the invention will now be described with reference to merely-preferred embodiments shown in the accompanying drawing, which illustrate but do not limit the invention, wherein.

DESCRIPTION OF THE PREFERRED EMBODIMENTS

Figure 1:
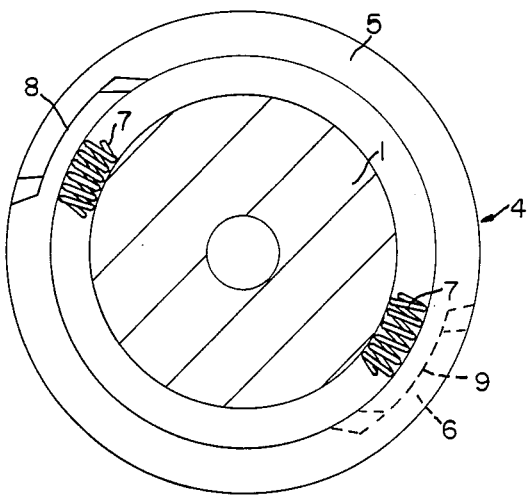
FIG. 1 is a plan view of one preferred embodiment, together with a section through an axially-reciprocable, refrigerator displacer on which it is used.
Figure 2:
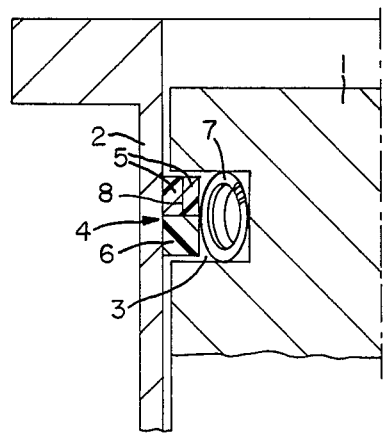
FIG. 2 is an axial section of a portion of the preferred embodiment of FIG. 1, together with a portion of the displacer and a portion of a housing therefor.

In the preferred embodiment of FIGS. 1 and 2, an axially-reciprocable, refrigerator displacer 1 in a cylindric housing 2 has a radial groove 3 for a piston-ring, sealing system at 4 carried in the groove. The system has two, axially-contiguous, rectangular-cross-section, congruent sealing rings 5 and 6 made of plastic, such as PTFE, for example.

Each ring 5, 6 has a split 8, 9, respectively, which is Z-shaped in the plane of the ring (in reversed, mirror image in the view of FIG. 1). The Z-shaped splits are circumferentially offset by 180 degrees relative to each other. The circumferential, overlappable middle portion of each split is concentric with and approximately midway of the radial width of its ring.

A wire-coil spring ring segment 7 radially fills the groove to the outermore rings 5, 6 at the splits in each ring. The axis of each wire-coil spring ring segment is in the plane of the axial contiguousness of the rings. The wire coils of each spring ring segment 7 are substantially radial.

FIG. 1 shows the sealing system before installation in the cylindric housing 2. When installed, as shown in FIG. 2, the coils of the spring segments 7 are compressed into the oval shown so that the peripheries of the rings 5 and 6 at the splits are radially expanded for slidably sealing to the housing.

Figure 3:
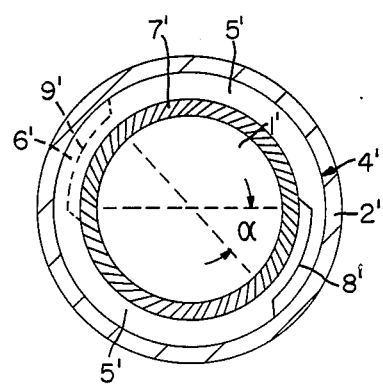
FIG. 3 is a plan view of another preferred embodiment, together with a displacer and, in section, cylindric housing for use.

FIG. 3 shows a similar sealing system at 4' installed in a cylindric housing 2'. Its wire-coil spring 7' is, however, a ring with the confronting ends of the wire coil ring welded together. The coils of the spring ring 7' are also inclined relative to the radial direction, at least when the sealing system is installed in the housing 2', so that they produce a bearing pressure on the sealing rings 5', 6' that is uniformly distributed around the periphery of the sealing rings. The circumferential, overlappable middle sections of the Z-shaped splits 8', 9' each extend over an angle alpha of about 30 degrees. So long as the changes in the peripheral length of the sealing rings 5', 6' caused by the shrinkage of the ring material are smaller than what would correspond to an angle of 30 degrees, therefore, overlapping sections of each ring are maintained at the splits 8', 9'. The radial integrity of the sealing system is, therefore, assured even in the presence of pronounced shrinkage, as is axial integrity by the circumferential offset of the splits 8', 9' of the axially-contiguous, superposed seal rings 5', 6'.

It will be appreciated that the instant specification and claims are set forth by way of illustration and not of limitation, and that various changes and modifications may be made without departing from the spirit and scope of the present invention.

What is claimed is:

1. A piston-ring system, comprising:
   two, equal-radius, coaxial, axially-contiguous sealing rings, each ring having a split circumferentially offset from the split in the other ring, each split being substantially Z-shaped in a plane normal to the axis of the rings to have a substantially-circumferential, overlappable middle portion; and
   means for urging each ring at least at the middle portion of its split radially.

2. The piston-ring system of claim 1, wherein the means comprises a spring ring.

3. The piston-ring system of claim 2, in combination with a housing and a displacer of a refrigerator relatively reciprocable therein, wherein one of the housing and displacer has a radial groove for receiving the sealing and spring rings with the spring ring innermost of the groove.

4. The piston-ring system of claim 1, wherein the middle portion of each split is concentric and approximately midway of the radial width of its ring.

5. The piston-ring system of claim 2, wherein the middle portion of each split is concentric and approximately midway of the radial width of its ring.

6. The piston-ring system of claim 3, wherein the middle portion of each split is concentric and approximately midway of the radial width of its ring.

7. The piston-ring system of claim 1, wherein the middle portion of each split extends over a segment angle of from about 15 to about 45 degrees.

8. The piston-ring system of claim 2, wherein the middle portion of each split extends over a segment angle of from about 15 to about 45 degrees.

9. The piston-ring system of claim 3, wherein the middle portion of each split extends over a segment angle of from about 15 to about 45 degrees.

10. The piston-ring system of claim 4, wherein the middle portion of each split extends over a segment angle of from about 15 to about 45 degrees.

11. The piston-ring system of claim 5, wherein the middle portion of each split extends over a segment angle of from about 15 to about 45 degrees.

12. The piston-ring system of claim 6, wherein the middle portion of each split extends over a segment angle of from about 15 to about 45 degrees.

13. The piston-ring system of claim 2, wherein the sealing rings are axially contiguous in a plane and the spring ring comprises a wire coil, the axis of the wire coil being in the plane of axial contiguousness of the rings.

14. The piston-ring system of claim 3, wherein the sealing rings are axially contiguous in a plane and the spring ring comprises a wire coil, the axis of the wire coil being in the plane of axial contiguousness of the rings.

15. The piston-ring system of claim 5, wherein the sealing rings are axially contiguous in a plane and the spring ring comprises a wire coil, the axis of the wire coil being in the plane of axial contiguousness of the rings.

16. The piston-ring system of claim 6, wherein the sealing rings are axially contiguous in a plane and the spring ring comprises a wire coil, the axis of the wire coil being in the plane of axial contiguousness of the rings.

17. The piston-ring system of claim 8, wherein the sealing rings are axially contiguous in a plane and the spring ring comprises a wire coil, the axis of the wire coil being in the plane of axial contiguousness of the rings.

18. The piston-ring system of claim 9, wherein the sealing rings are axially contiguous in a plane and the spring ring comprises a wire coil, the axis of the wire coil being in the plane of axial contiguousness of the rings.

19. The piston-ring system of claim 11, wherein the sealing rings are axially contiguous in a plane and the spring ring comprises a wire coil, the axis of the wire coil being in the plane of axial contiguousness of the rings.

20. The piston-ring system of claim 12, wherein the sealing rings are axially contiguous in a plane and the spring ring comprises a wire coil, the axis of the wire coil being in the plane of axial contiguousness of the rings.

* * * * *